United States Patent

Szadkowski et al.

[11] Patent Number: 6,105,744
[45] Date of Patent: Aug. 22, 2000

[54] WELDED ANNULAR DISC AND REINFORCING PLATE ASSEMBLY

[75] Inventors: Andrzej Szadkowski, Fort Wayne; Kevin F. Schlosser, Auburn; Daniel V. Gochenour, Auburn; Greg W. Batterton, Auburn; Michael L. Bassett, Auburn, all of Ind.; Loren H. Uthoff, Northville, Mich.

[73] Assignee: Eaton Corporation, Cleveland, Ohio

[21] Appl. No.: 09/299,594

[22] Filed: Apr. 23, 1999

[51] Int. Cl.$^7$ .................................................. F16D 13/68
[52] U.S. Cl. .......................... 192/212; 464/68; 228/165; 192/107 R
[58] Field of Search ............................... 192/107 R, 200, 192/207, 212, 213.1; 464/66, 67, 68; 403/270, 271, 272; 228/165, 166, 168

[56] References Cited

U.S. PATENT DOCUMENTS

| | | | |
|---|---|---|---|
| 1,782,234 | 11/1930 | Hofmann | 228/165 X |
| 3,578,121 | 5/1971 | Maurice | 464/68 X |
| 5,419,422 | 5/1995 | Schraut. | |

FOREIGN PATENT DOCUMENTS

| | | | |
|---|---|---|---|
| 2690960 | 11/1993 | France | 192/107 R |
| 2165323 | 4/1986 | United Kingdom. | |

*Primary Examiner*—Richard M. Lorence
*Attorney, Agent, or Firm*—Dykema Gossett PLLC

[57] ABSTRACT

A clutch driven disc assembly includes a hub, an annular spring plate, an annular disc assembly, a plurality of drive springs, and a disc assembly. The hub has an axis of rotation. The annular spring plate rotatably is fixed to the hub. The annular disc assembly is mounted concentric with the axis of rotation for rotation relative to the spring plate. The plurality of drive springs is operably disposed between the spring plate and the disc assembly. The disc assembly has a reinforcing plate with spring pockets which receive the drive springs. The reinforcing plate has oppositely facing faces. The annular disc has a friction element fixed thereto and also has a plurality of attachment apertures passing therethrough. The weld bead is disposed in each of the attachment apertures and fixes the annular disc to one of the reinforcing plate faces.

7 Claims, 1 Drawing Sheet

WELDED ANNULAR DISC AND REINFORCING PLATE ASSEMBLY

FIELD OF THE INVENTION

This invention relates in general to friction clutches and in particular to the structure of clutch driven discs.

BACKGROUND OF THE INVENTION

Clutches are well known devices used to selectively connect a source of rotational power, such as the crankshaft of an internal combustion engine and its flywheel, to a driven mechanism, such as a transmission. Typically, clutches have a driven disc rotatably fixed to the transmission input shaft and axially disposed between a flywheel and a pressure plate. Both the flywheel and the pressure plate are rotatably fixed to the output shaft of the engine. The pressure plate is axially biased toward the flywheel by an axial spring load. When the clutch is in an engaged condition, the pressure plate clamps the driven disc against the flywheel. Friction material is disposed on the driven disc to resist slipping between the driven disc and both the pressure plate and the flywheel. When the clutch is in a released condition, the axial spring load is overcome by a release mechanism, unclamping the driven disc. With the driven disc unclamped, relative rotation between the transmission input shaft and the engine output shaft becomes possible. When the clutch is reengaged, the pressure plate is pressed against the friction material, halting relative rotation between the engine output shaft and the transmission input shaft.

The driven disc is annularly divided into two relatively rotatable portions: the hub which is rotatively fixed to the input shaft, and the annular disc assembly which bears the friction material. The damping springs are disposed between the hub and the annular disc assembly.

The annular disc assembly has a relatively stiff portion, called a reinforcing plate, which engages the damper springs. A thinner annular disc extends outwardly radially from the reinforcing plate and bears the friction material. Using thinner material for the annular disc than the reinforcing plate allows the assembly to be of sufficient strength to engage the damper springs while being of relatively low rotative inertia. Commonly, the annular disc is riveted to the reinforcing plate. It is desired to provide a connection between the annular disc and the reinforcing plate which is stronger than the connection provided by rivets. It is also desired to provide a connection between the reinforcing plate and the annular disc which is well suited for adapting to specific packaging and space constraint limitations within a clutch assembly.

SUMMARY OF THE INVENTION

A clutch driven disc assembly includes a hub, an annular spring plate, an annular disc assembly, and a plurality of drive springs. The hub has an axis of rotation. The annular spring plate rotatably is fixed to the hub. The annular disc assembly is mounted concentric with the axis of rotation for rotation relative to the spring plate. The plurality of drive springs is operably disposed between the spring plate and the disc assembly. The disc assembly has a reinforcing plate with spring pockets which receive the drive springs. The reinforcing plate has oppositely facing faces. The annular disc assembly also has an annular disc with a friction element fixed thereto and also has a plurality of attachment apertures passing therethrough. The weld bead is disposed in each of the attachment apertures and fixes the annular disc to one of the reinforcing plate faces.

This invention provides a clutch driven disc which has a connection between its annular disc and reinforcing plate which is stronger than a connection provided by rivets. This invention also provides a connection between the reinforcing plate and the annular disc which is well suited for adapting to specific packaging and space constraint limitations within a clutch assembly.

DESCRIPTION OF PREFERRED EMBODIMENTS

Figure 1:
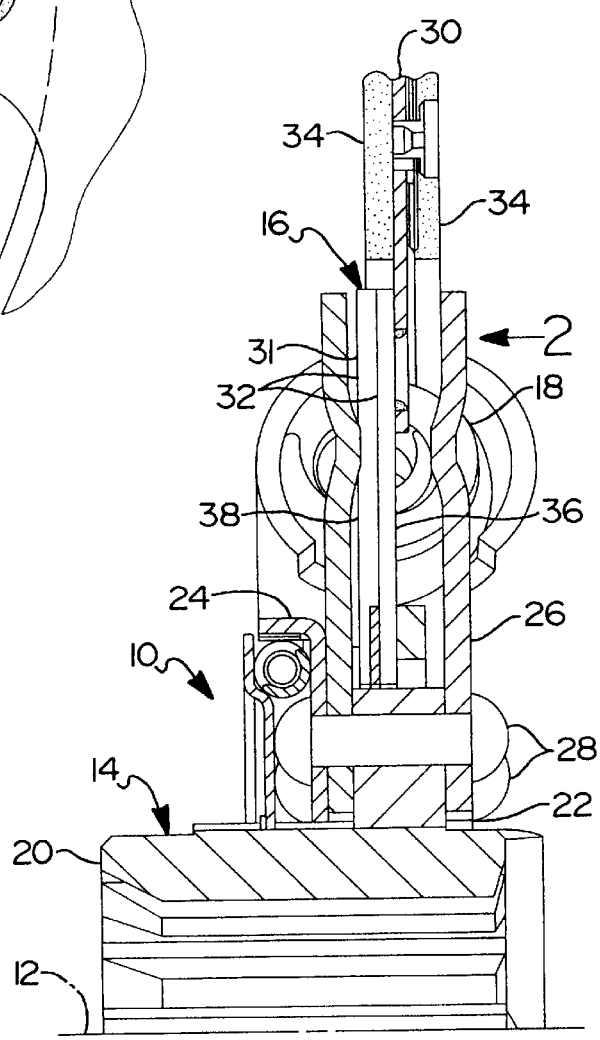
FIG. 1 is a partial sectional side view of a clutch driven disc.

A clutch driven disc assembly 10 as shown in FIG. 1 includes an axis of rotation 12, a hub assembly 14, a disc assembly 16 and a plurality of damping or drive springs 18 disposed between hub assembly 14 and disc assembly 16.

Hub assembly 14 includes an inner hub 20 and an outer hub 22. A predamper 24 is disposed between inner hub 20 and outer hub 22. A pair of spring plates 26 are fixed to outer hub 22 by rivets 28.

Disc assembly 16 includes an annular disc 30 attached to an annular reinforcing plate 31 defined by a pair of overlapped stack plates 32. Stack plates 32 are axially disposed between spring plates 26. Drive springs 18 are disposed simultaneously in spring pockets 33 in stack plates 32 and spring pockets in spring plates 26. Relative rotation of disc assembly 16 to hub assembly 14 compresses drive springs 18.

Stack plates 32 can be fixed to each other by rivets (not shown), welding or any other appropriate means. Reinforcing plate 31 can alternatively be formed as a single, thicker plate in place of the thinner stack plates 32. Annular disc 30 has friction element 34 made of friction material on both sides thereof for frictional engagement with a clutch flywheel (not shown) and a clutch pressure plate (not shown) when installed in a vehicle.

Figure 2:
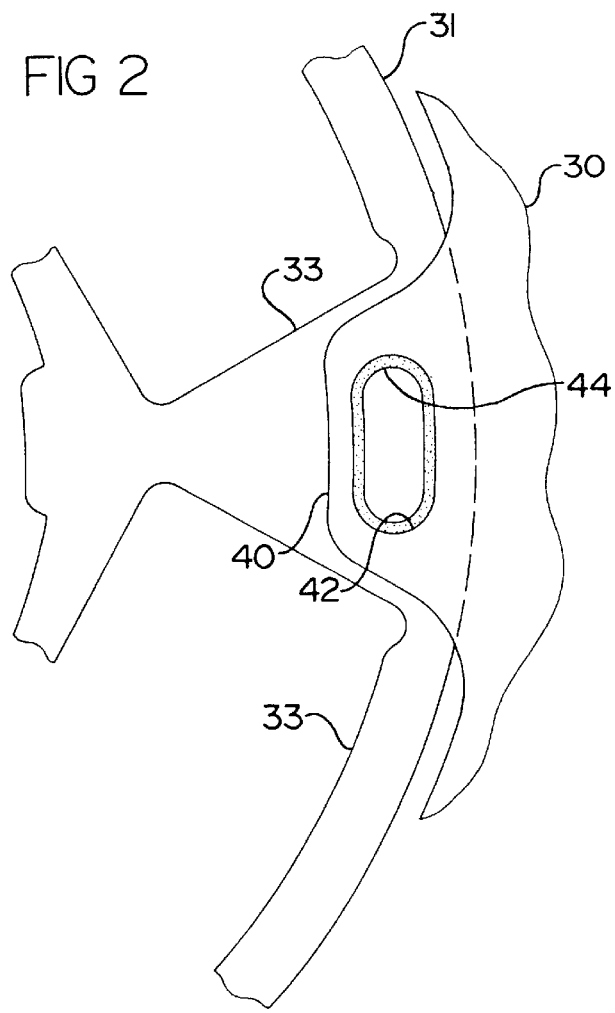
FIG. 2 is an end view of a broken out portion of the clutch driven disc of FIG. 1 in the direction of arrow 2.

In the embodiment shown in FIGS. 1 and 2, annular disc 30 is attached to reinforcing plate 31 on an engine face 36 of plate 31. The engine face is the side which is directed toward the engine and the flywheel when disc assembly 10 is installed in a vehicle. By mounting disc 30 to engine face 36, friction elements 34 can advantageously be positioned in a preferred location relative to spring plates 26 and hub assembly 14 with little or no axial offset of flanges 40 relative to the portion of disc 30 carrying friction elements 34. Such positioning may be necessitated by space limitations within the clutch and within clutch driven disc assembly 10. Alternatively, disc 30 may be attached to a transmission face 38 of plate 31 if space considerations so demand.

Disc 30 is fixed to either face 36 or 38 by welding. Disc 30 has radially inwardly extending flanges 40 which overlap plate 31 and are interposed between spring pockets 33. Flanges 40 each have an elongated weld aperture 42 also overlapping plate 31. A weld bead 44 circumscribes each aperture 42, fixing disc 30 to plate 31. The elongate shape advantageously increases the amount of weld metal of the connection given a relatively small amount of radial overlap between flanges 40 and plate 31.

It should be appreciated that clutch driven discs fall into a category of devices which can be described as torsional dampers. Another type of torsional damper which is known simply as a torsional damper is employed with automatic transmissions. Such torsional dampers are disposed between between an engine crankshaft and an automatic transmission torque converter. The torsional damper has essentially the same structure as the above described driven disc assembly 10, but without friction elements 34. Typically, annular disc 30 would be bolted to the torque converter and hub assembly 14 would be bolted to the engine crankshaft. Such torsional dampers would benefit from the above described reinforcing plate 31 to annular disc 30 attachment in the same manner that the driven disc assembly benefits.

A method for fabricating a torsional damper is now described. Hub 14 is formed by conventional means, including stamping, forging, casting or other appropriate metal forming processes. Annular spring plates 26 are similarly formed by an appropriate metal forming process and rotatably fixed to hub 14. Annular disc assembly 16 is located concentric with spring plates 26 for rotation relative to spring plate 26. A plurality of drive springs 18 are installed between spring plates 26 and disc assembly 16. Annular disc assembly 16 is first assembled from reinforcing plate 31 and annular disc 30. Reinforcing plate 31 is stamped of steel and has spring pockets 33 formed therein configured to receive springs 18. Annular disc 30 is stamped of steel and has a plurality of radially inwardly extending flanges 40. Attachment apertures 42 are formed in each of flanges 40. Flanges 40 are configured to overlap reinforcing plate 31. Flanges 40 are placed over engine face 36 between spring pockets 33 of reinforcing plate 31. Annular disc 30 is welded to reinforcing plate 31 by placing a weld bead 44 around each of attachment apertures 42, thereby fixing annular disc 30 to reinforcing plate face 36.

The embodiments disclosed herein have been discussed with the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

We claim:

1. A clutch driven disc assembly comprising:
    a hub having an axis of rotation;
    an annular spring plate rotatably fixed to the hub;
    an annular disc assembly mounted concentric with the axis of rotation for rotation relative to the spring plate;
    a plurality of drive springs operably disposed between the spring plate and the disc assembly;
    the annular disc assembly including:
        a reinforcing plate having spring pockets receiving the drive springs and the reinforcing plate also having oppositely facing faces;
        an annular disc having a friction element fixed thereto and having a plurality of radially inwardly extending flanges overlapping the reinforcing plate in which are defined a plurality of attachment apertures; and
        a weld bead disposed in each of the attachment apertures fixing the annular disc to one of the reinforcing plate faces.

2. A clutch driven disc assembly as claimed in claim 1 wherein the flanges extend between the spring pockets of the reinforcing plate.

3. A clutch driven disc assembly as claimed in claim 1 wherein the apertures are elongated in the circumferential direction.

4. A torsional damper comprising:
    a hub having an axis of rotation;
    an annular spring plate rotatably fixed to the hub;
    an annular disc assembly mounted concentric with the axis of rotation for rotation relative to the spring plate;
    a plurality of drive springs operably disposed between the spring plate and the disc assembly;
    the disc assembly including:
        a reinforcing plate having spring pockets receiving the drive springs and the reinforcing plate also having oppositely facing faces;
        an annular disc having a plurality of radially inwardly extending flanges overlapping the reinforcing plate in which are defined a plurality of attachment apertures; and
        a weld bead disposed in each of the attachment apertures fixing the annular disc to one of the reinforcing plate faces.

5. A torsional damper as claimed in claim 4 wherein the flanges extend between the spring pockets of the reinforcing plate.

6. A torsional damper as claimed in claim 4 wherein the apertures are elongated in the circumferential direction.

7. A method for fabricating a torsional damper including the steps of:
    forming a hub;
    rotatably fixing an annular spring plate to the hub concentric thereto;
    mounting an annular disc assembly concentric with the hub for rotation relative to the spring plate;
    installing a plurality of drive springs between the spring plate and the disc assembly;
    forming the disc assembly by:
        forming a reinforcing plate to have oppositely facing face and having spring pockets configured to receive the drive springs;
        forming an annular disc having a plurality of radially inwardly extending flanges configured to overlap the reinforcing plate in which are defined attachment apertures;
        placing the flanges over one of the reinforcing plate faces and between the spring pockets of the reinforcing plate; and
        welding the annular disc to the reinforcing plate by placing a weld bead around each of the attachment apertures, thereby fixing the annular disc to one of the reinforcing plate faces.

* * * * *